United States Patent

Sano et al.

Patent Number: 5,322,828
Date of Patent: Jun. 21, 1994

[54] NON-REDUCIBLE DIELECTRIC CERAMIC COMPOSITION

[75] Inventors: Harunobu Sano, Kyoto; Yukio Hamaji, Nagaokakyo; Kunisaburo Tomono, Otsu, all of Japan

[73] Assignee: Murata Manufacturing Co., Ltd., Japan

[21] Appl. No.: 139,531

[22] Filed: Oct. 19, 1993

[30] Foreign Application Priority Data

Oct. 23, 1992 [JP] Japan .................. 4-309264

[51] Int. Cl.$^5$ ............................................. C04B 35/49
[52] U.S. Cl. ...................................... 501/137; 501/139
[58] Field of Search ....................... 501/137, 138, 139

[56] References Cited

U.S. PATENT DOCUMENTS

| | | | |
|---|---|---|---|
| 5,030,386 | 7/1991 | Saxton et al. | 501/139 |
| 5,248,640 | 9/1993 | Sano et al. | 501/137 |
| 5,264,402 | 11/1993 | Sano et al. | 501/139 |

FOREIGN PATENT DOCUMENTS 3800198  7/1988  Fed. Rep. of Germany .......... C04B 35/49

Primary Examiner—Karl Group
Assistant Examiner—Deborah Jones
Attorney, Agent, or Firm—Ostrolenk, Faber, Gerb & Soffen

[57] ABSTRACT

A non-reducible dielectric ceramic composition consists essentially of a main component consisting essentially of oxides of BaO, CaO, MgO, TiO$_2$, ZrO$_2$ and Nb$_2$O$_5$ and having a composition expressd by the general formula:

$$\{(Ba_{1-x-y}Ca_xMg_y)O\}_m(Ti_{1-o-p}Zr_oNb_p)O_{2+p/2}$$

wherein $0 < x \leq 0.20$, $0 < y \leq 0.05$, $0 < o \leq 0.25$, $0.0005 \leq p \leq 0.023$, and $1.000 \leq m \leq 1.03$; at least one primary additive selected from the group consisting of oxides of Mn, Fe, Cr, Co and Ni; and at least one secondary additive selected from the group consisting of SiO$_2$ and ZnO. The primary additives contained in an mount of 0.02 to 2.0 moles per 100 moles of the main component in terms of respective oxides, MnO$_2$, Fe$_2$O$_3$, Cr$_2$O$_3$, CoO and NiO, while the secondary additive is contained in an amount of 0.1 to 2.0 moles per 100 moles of the main component.

1 Claim, No Drawings

NON-REDUCIBLE DIELECTRIC CERAMIC COMPOSITION

BACKGROUND OF THE INVENTION

1. Field of the Invention

The present invention relates to a non-reducible dielectric ceramic composition and, more particularly, a non-reducible dielectric ceramic composition used for monolithic ceramic capacitors.

2. Description of the Prior Art

In general, monolithic ceramic capacitors comprises plural dielectric ceramic layers united into a monolithic body, a plurality of internal electrodes formed between adjacent dielectric ceramic layers, and external electrodes formed on opposite sides of said monolithic body and connected to the alternate internal electrodes.

Such monolithic ceramic capacitors are generally produced with a dielectric ceramic composition mainly comprising barium titanate by the steps of preparing green ceramic sheets, applying a paste for internal electrodes on one flat surface of each the green ceramic sheets, stacking and pressing several green sheets to form a green multilayer ceramic body, cutting the multilayer ceramic body into green capacitor chips, firing them in air at a temperature ranging from 1250° to 1350° C. to form monolithic capacitor chips with internal electrodes, applying a paste for external electrodes on opposite sides of the monolithic capacitor chips, and baking them at a suitable temperature to complete monolithic capacitors.

Accordingly, a material for internal electrodes is required to meet the following conditions: (a) to have a melting point higher than the sintering temperature of the dielectric ceramics as the internal electrodes are fired along with the dielectric ceramic material; and (b) is not oxidized even in an oxidizing atmosphere, and does not react with the dielectric ceramics.

To meet such requirements, noble metals such as platinum, gold, palladium and their alloys have been used as a material for internal electrodes of monolithic ceramic capacitors. However, noble metals are expensive so that use of such noble metals causes increase in the production cost of the monolithic ceramic capacitors. For example, the cost of internal electrodes occupies about 30 to 70% of the production cost of monolithic ceramic capacitors.

Other metals having a high melting point are base metals such as Ni, Fe, Co, W and Mo. However, such base metals are oxidized easily in an oxidizing atmosphere at a high temperature, so that they loose the functions as internal electrodes. Thus, in order to use such a base metal as a material for internal electrodes of monolithic ceramic capacitors, it is required to fire the dielectric ceramic material in a neutral or reducing atmosphere. However, the dielectric ceramic compositions of the prior art are reduced considerably when fired in the reducing atmosphere, resulting in semiconductorization of the ceramic composition.

To solve such problems, it has been proposed in JP-B- S57-42588 to use a dielectric ceramic material comprising a solid solution of a barium titanate system and having a ratio of a barium site to a titanium site greater than the stoichiometric value, i.e., 1.00. Such a dielectric ceramic material is scarcely semiconductorized even if fired in a reducing atmosphere, thus making it possible to manufacture monolithic ceramic capacitors employing a base metal such as nickel as a material for internal electrodes.

On the other hand, the development of electronic techniques have led to considerable miniaturization of electronic devices. For this reason, there is an increasing demand for miniaturization of electronic parts including monolithic ceramic capacitors. It is generally known that the monolithic ceramic capacitors can be miniaturized by use of a dielectric ceramic material with a high dielectric constant or by decreasing a thickness of dielectric ceramic layers. However, the dielectric ceramic materials with a high dielectric constant are large in grain size. Thus, if the thickness of dielectric ceramic layers is decreased to 10 μm or below, the number of crystal grains present in each layer is considerably decreased, resulting in poor reliability of monolithic ceramic capacitors.

SUMMARY OF THE INVENTION

It is therefore a main object of the present invention to provide a non-reducible dielectric ceramic composition which is large in dielectric constant but small in crystal grain size and which is never semiconductorized even if fired in a reducing atmosphere.

According to the present invention, there is provided a non-reducible dielectric ceramic composition consisting essentially of a main component, at least one primary additive selected from the group consisting of oxides of Mn, Fe, Cr, Co and Ni, and at least one secondary additive selected from the group consisting of $SiO_2$ and ZnO, said main component consisting essentially of oxides of BaO, CaO, MgO, $TiO_2$, $ZrO_2$ and $Nb_2O_5$ and having a composition expressed by the general formula:

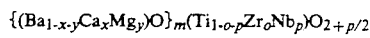

$$\{(Ba_{1-x-y}Ca_xMg_y)O\}_m(Ti_{1-o-p}Zr_oNb_p)O_{2+p/2}$$

Wherein $0 < x \leq 0.20$, $0 < y \leq 0.05$, $0 < o \leq 0.25$, $0.0005 \leq p \leq 0.023$, and $1.000 \leq m \leq 1.03$, the content of said primary additive being 0.02 to 2.0 moles per 100 moles of said main component when calculated in terms of respective oxides, $MnO_2$, $Fe_2O_3$, $Cr_2O_3$, CoO and NiO, the content of said secondary additive being 0.1 to 2.0 moles per 100 moles of said main component.

The dielectric ceramic composition of the present invention is never reduced or semiconductorized even if fired in a reducing atmosphere. In addition, it can be fired at a temperature of not more than 1250° C. Accordingly, the non-reducible dielectric ceramic composition of the present invention makes it possible to use base metals as a material for internal electrodes of monolithic ceramic capacitors, which in turn makes it possible to cut down the production cost of monolithic ceramic capacitors.

The non-reducible dielectric ceramic composition of the present invention has a small grain size of not more than 3 μm though it possesses a high dielectric constant of not less than 9000, thus making it possible to thin the dielectric layers without causing decrease in the number of crystal grains present in each dielectric layer. Thus, according to the present invention, it is possible to manufacture monolithic ceramic capacitors which have high reliability and are small in size but large in capacitance.

The above and other objects, features and advantages of the present invention will become apparent from the following examples.

EXAMPLE 1

Using $BaCO_3$, $CaCO_3$, MgO, $TiO_2$, $ZrO_2$, $Nb_2O_5$, $MnO_2$, $Fe_2O_3$, $Cr_2O_3$, CoO, NiO, $SiO_2$ and ZnO with the purity of not less than 99.8% as raw materials, there were prepared specimens for measurements of electrical properties of nonreducible dielectric ceramic composition in the following manner: The raw materials $BaCO_3$, $CaCO_3$, MgO, $TiO_2$, $ZrO_2$ and $Nb_2O_5$ were weighed and mixed to prepare mixtures for main components expressed by the general formula:

$$\{(Ba_{1-x-y}Ca_xMg_y)O\}_m(Ti_{1-o-p}Zr_oNb_p)O_{2+p/2}$$

with values of x, y, o, p and m shown in Table 1.

The remaining raw materials (Group A: $MnO_2$, $Fe_2O_3$, $Cr_2O_3$, CoO and NiO, Group B: $SiO_2$ and ZnO) were added to the resultant mixture as a primary additive (A) or a secondary additive (B). The added amounts of the primary additive (A) and secondary additive (B) were listed in Table 1 in molar amounts per 100 moles of the main component, respectively.

The resultant mixture of the raw materials was wet-milled for 16 hours with a ball mill, dried by evaporation and then calcined in air at 1100 °C. for 2 hours. The clinker was ground by a dry grinding machine to prepare a powder with a particle size of 1 μm or smaller.

The resultant powder was added with suitable amounts of pure water and a polyvinyl acetate binder and wet-milled for 16 hours with a ball mill. After drying, the mixture was molded into disks of a diameter of 10 mm and a thickness of 0.5 mm at 2000 Kg/cm². The resultant green ceramic disks were heated to 500° C. in air to remove the organic binder by combustion, and then fired at a temperature shown in Table 2 for 2 hours in a reducing atmosphere consisting of $H_2$, $N_2$ and air with an oxygen pressure ranging from $3\times10^{-8}$ to $3\times10^{-10}$ atm to prepare ceramic disks.

The resultant ceramic disks were observed by a scanning-electron microscope at a magnification of 1500 to determine crystal gain size.

Each ceramic disk was provided on its opposite sides with silver electrodes by applying a silver paste and then baking it at 800 °C. for 30 minutes in a nitrogen atmosphere to prepare a specimen for measurements of electrical properties.

For each specimen, measurements were made on dielectric constant ($\epsilon$), dielectric loss (tan $\delta$), and a temperature coefficient (TC) of capacitance (C), and insulation resistance. The dielectric constant and dielectric loss were measured at 25 °C., 1 Khz and 1 Vrms. The temperature coefficient (TC) of capacitance was determined over the temperature range of $-25°$ C. to 85° C. on the basis of the capacitance at 20° C. along with the largest absolute value of TC in the range of $-25°$ C. to 85° C. The temperature coefficient (TC) of capacitance was given by equation: TC $\Delta C/C_{20}$, where $\Delta C$ is difference between capacitance at measured temperature and that at 20° C., and $C_{20}$ is a capacitance at 20 °C. The insulating resistance was measured at 25 °C. and 85 °C. after applying a direct voltage of 500 V to the specimen for 2 minutes. Results are shown in Table 2 in which the insulating resistance is given as a logalithimic value of volume resistance.

In Table 1 and Table 2, specimens with an asterisk are those having a composition out of the scope of the present invention.

TABLE 1

| No. | Main component $\{Ba_{1-x-y}Ca_xMg_y)O\}_m(Ti_{1-o-p}Zr_oNb_p)O_{2\pm p/2}$ | | | | | Additive (A) (mole) | | | | | Additive (B) | |
|---|---|---|---|---|---|---|---|---|---|---|---|---|
| | x | y | m | o | p | $MnO_2$ | $Fe_2O_3$ | $Cr_2O_3$ | CoO | NiO | $SiO_2$ | ZnO |
| 1* | 0 | 0.004 | 1.005 | 0.16 | 0.0075 | 0.3 | — | — | — | — | 0.5 | 0.2 |
| 2* | 0.05 | 0 | 1.005 | 0.10 | 0.018 | 0.3 | — | — | — | — | 0.5 | 0.2 |
| 3* | 0.03 | 0.005 | 1.005 | 0 | 0.01 | 0.3 | — | — | — | — | 0.5 | 0.2 |
| 4* | 0.13 | 0.005 | 1.01 | 0.16 | 0 | 0.3 | — | — | — | — | 0.5 | 0.2 |
| 5* | 0.05 | 0.005 | 0.995 | 0.12 | 0.01 | 0.3 | — | — | — | — | 0.5 | 0.2 |
| 6* | 0.03 | 0.004 | 1.01 | 0.13 | 0.01 | — | — | — | — | — | 0.5 | 0.4 |
| 7* | 0.11 | 0.003 | 1.01 | 0.10 | 0.01 | 0.3 | — | — | — | — | — | — |
| 8 | 0.01 | 0.005 | 1.03 | 0.17 | 0.005 | 0.5 | — | 0.1 | — | — | 1.0 | 1.0 |
| 9 | 0.12 | 0.0005 | 1.01 | 0.13 | 0.005 | 0.2 | — | — | — | 0.2 | 0.4 | 0.2 |
| 10 | 0.02 | 0.003 | 1.01 | 0.25 | 0.0005 | 0.02 | — | — | — | — | 0.7 | 0.2 |
| 11 | 0.13 | 0.002 | 1.01 | 0.10 | 0.01 | 0.5 | — | — | — | — | 0.4 | — |
| 12 | 0.20 | 0.05 | 1.000 | 0.01 | 0.023 | 1.0 | 0.1 | 0.1 | 0.5 | 0.3 | 0.1 | — |
| 13 | 0.02 | 0.003 | 1.005 | 0.14 | 0.01 | 0.5 | — | — | — | — | 0.5 | 0.2 |
| 14 | 0.07 | 0.01 | 1.01 | 0.12 | 0.012 | 0.4 | — | — | 0.1 | — | 0.5 | 0.3 |
| 15 | 0.10 | 0.005 | 1.01 | 0.13 | 0.0075 | 0.3 | — | — | — | 0.2 | 0.5 | 0.2 |
| 16* | 0.25 | 0.004 | 1.005 | 0.12 | 0.01 | 0.3 | — | — | — | — | 0.5 | 0.2 |
| 17* | 0.05 | 0.08 | 1.01 | 0.15 | 0.01 | 0.3 | — | — | — | — | 0.5 | 0.2 |
| 18* | 0.08 | 0.01 | 1.005 | 0.30 | 0.01 | 0.3 | — | — | — | — | 0.5 | 0.2 |
| 19* | 0.05 | 0.005 | 1.005 | 0.05 | 0.03 | 0.3 | — | — | — | — | 0.5 | 0.2 |
| 20* | 0.05 | 0.004 | 1.04 | 0.13 | 0.01 | 0.3 | — | — | — | — | 0.5 | 0.2 |
| 21* | 0.05 | 0.004 | 1.01 | 0.13 | 0.01 | 3.0 | — | — | — | — | 0.5 | 0.2 |
| 22* | 0.08 | 0.01 | 1.01 | 0.10 | 0.01 | 0.3 | — | — | — | — | 2.0 | 2.0 |

TABLE 2

| No. | Sintering temp. (°C.) | $\epsilon$ | tan $\delta$ (%) | TC of capacitance $\Delta C/C_{20}$ (%) | | | Volume resistivity log $\rho$ (Ω.cm) | | Grain size (μm) |
|---|---|---|---|---|---|---|---|---|---|
| | | | | $-25°$ C. | 85° C. | $|\Delta C/C_{20}|$max | 25° C. | 85° C. | |
| 1* | 1320 | 18100 | 3.7 | $-79$ | $-59$ | 79 | 12.3 | 8.1 | 3.0 |
| 2* | 1250 | 17200 | 2.0 | $-78$ | $-60$ | 78 | 11.1 | 8.0 | 3.0 |
| 3* | 1250 | 5500 | 1.8 | $-69$ | $-12$ | 193 | 13.2 | 12.5 | 2.0 |
| 4* | 1250 | 7300 | 1.0 | $-50$ | $-46$ | 50 | 13.5 | 12.7 | 5.0 |
| 5* | 1230 | | | | unmeasurable | | | | 2.0 |

TABLE 2-continued

| No. | Sintering temp. (°C.) | ε | tan δ (%) | TC of capacitance ΔC/C$_{20}$ (%) −25° C. | 85° C. | \|ΔC/C$_{20}$\|max | Volume resistivity log ρ (Ω.cm) 25° C. | 85° C. | Grain size (μm) |
|---|---|---|---|---|---|---|---|---|---|
| 6* | 1220 | 16700 | 1.5 | −77 | −70 | 77 | 12.2 | 8.5 | 2.0 |
| 7* | 1320 | 10300 | 2.4 | −54 | −47 | 54 | 13.0 | 12.3 | 2.5 |
| 8 | 1170 | 14500 | 0.9 | −73 | −70 | 73 | 13.3 | 12.5 | 2.0 |
| 9 | 1220 | 9200 | 0.8 | −51 | −45 | 51 | 13.5 | 12.4 | 2.5 |
| 10 | 1220 | 12600 | 0.8 | −70 | −67 | 70 | 13.7 | 13.0 | 3.0 |
| 11 | 1250 | 11100 | 0.9 | −50 | −52 | 52 | 13.3 | 12.6 | 2.5 |
| 12 | 1250 | 10400 | 1.1 | −59 | −72 | 72 | 12.8 | 12.0 | 3.0 |
| 13 | 1220 | 16500 | 0.5 | −67 | −75 | 75 | 13.4 | 12.8 | 2.0 |
| 14 | 1200 | 11900 | 0.5 | −62 | −69 | 69 | 13.5 | 13.0 | 2.0 |
| 15 | 1220 | 11500 | 0.8 | −51 | −47 | 51 | 13.3 | 12.9 | 3.0 |
| 16* | 1360 | 5200 | 0.1 | −33 | −54 | 54 | 13.4 | 12.8 | 3.0 |
| 17* | 1250 | 6900 | 1.7 | −31 | −50 | 50 | 11.7 | 11.3 | 4.0 |
| 18* | 1350 | 4400 | 0.03 | +15 | −62 | 62 | 13.5 | 12.5 | 3.0 |
| 19* | 1250 | | | | unmeasurable | | | | 2.0 |
| 20* | | | | | not sintered | | | | |
| 21* | 1220 | 17400 | 2.6 | −70 | −78 | 78 | 11.3 | 8.0 | 3.0 |
| 22* | 1250 | 7000 | 1.3 | −42 | −49 | 49 | 11.9 | 11.0 | 5.0 |

As can be seen from the results shown in Table 1, the non-reducible dielectric ceramic composition of the present invention possesses a high dielectric constant of 9000 and higher, a low dielectric loss of 2.0% and smaller, and good temperature coefficient of capacitance which meets requirements of E characteristics or F characteristics defined by JIS in the temperature range of −25° C. to +85° C.

In addition, the composition of the present invention has a high insulating resistance of which a logalithimic value of volume resistance is not less than 12. Also, it can be sintered at a relatively low temperature of not more than 1250° C. and has a small grain size of 3 μm and smaller.

The main component of the non-reducible dielectric ceramic composition has been limited to those having a composition expressed by the general formula: $\{(Ba_{1-x-y}Ca_xMg_y)O\}_m(Ti_{1-o-p}Zr_oNb_p)O_{2+p/2}$ with values of x, y, m, o and p falling within the above respective ranges for the following reasons:

If the molar fraction of calcium, x, is 0 like as specimen No. 1, the sintering properties of the dielectric ceramic composition become worse, the dielectric loss exceeds 2.0%, and the insulating resistance becomes lowered. If the molar fraction of calcium, x, exceeds 0.20 like as specimen No. 16, the sintering properties of the ceramics becomes worse and the dielectric constant becomes lowered. For these reasons, the molar fraction of calcium has been limited to a value of more than 0 but not more than 0.20.

If the molar fraction of magnesium, y, is 0 like as specimen No. 2, good results are never obtained as the insulating resistance becomes lowered. If the molar fraction of magnesium, y, exceeds 0.05, like as specimen No. 17, the dielectric constant is lowered to less than 9000 and the insulating resistance becomes lowered. In addition, the crystal grain size exceeds 3 μm. For these reasons, the molar fraction of magnesium has been limited to a value of more than 0 but not more than 0.05.

If the molar fraction of zirconium, o, is 0, like as specimen No. 3, the dielectric constant becomes less than 9000 and the temperature coefficient of capacitance becomes large. On the other hand, if the molar fraction of zirconium, o, exceeds 0.25 like as specimen No. 18, the sintering properties become lowered and the dielectric constant is lowered to less than 9000. For these reasons, the molar fraction of zirconium has been limited to a value of more than 0 but not more than 0.25.

If the molar fraction of niobium, p, is less than 0.0005, like as specimen No. 4, the dielectric constant becomes less than 9000 and the crystal grain size exceeds 3 μm. Thus, it is impossible to make dielectric layers thin when applied to monolithic ceramic capacitors. On the other hand, if p exceeds 0.023, like as specimen No. 19, the ceramic composition is reduced and semiconductorized when fired in a reducing atmosphere, resulting in considerable decrease in the insulating resistance. Thus, the molar fraction of niobium has been limited to a value of not less than 0.0005 but not more than 0.023.

If the molar ratio of $(Ba_{1-x-y}Ca_xMg_y)O$ to $(Ti_{1-o-p}Zr_oNb_p)O_{2+p/2}$, i.e., m, is less than 1.000, like as specimen No. 5, the ceramic composition is reduced and semiconductorized when fired in a reducing atmosphere. In contrast therewith, if m exceeds 1.03, like as specimen No. 20, the sintering properties becomes considerably lowered. Thus, the molar ratio of the barium site to titanium site has been limited to a value of not less than 1.000 but not more than 1.03.

Further, if the added amount of the primary additive (A) in terms of respective oxides, $MnO_2$, $Fe_2O_3$, $Cr_2O_3$, CoO and NiO is less than 0.02 mole per 100 mole of the main component, like as specimen No. 6, the insulating resistance at a temperature of more than 85° C. becomes small, resulting in lowering of the reliability in a long use at a high temperature. If the added amount of the primary additive (A) exceeds 2.0 moles per 100 mole of the main component, like as specimen No. 21, the dielectric loss exceeds 2.0% and the insulating resistance becomes lowered. For these reasons, the added amount of the primary additive (A) has been limited to a value ranging from 0.02 to 2.0 moles per 100 moles of the main component.

If the added amount of the secondary additive (B) is less than 0.1 mole per 100 moles of the main component, like as specimen No. 7, the sintering property becomes lowered and the dielectric loss exceeds 2.0%. If the added amount of the secondary additive (B) exceeds 2.0 moles per 100 moles of the main component, like as specimen No. 22, the dielectric constant is decreased to less than 9000 and the insulating resistance becomes lowered. Also, the crystal grain size becomes more than 3 μm. Thus, the added amount of the secondary additive (B) has been limited to those ranging from 0.1 to 2.0 moles per 100 moles of the main component.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A non-reducible dielectric ceramic composition consisting essentially of a main component, at least one primary additive selected from the group consisting of oxides of Mn, Fe, Cr, Co and Ni, and at least one secondary additive selected from the group consisting of $SiO_2$ and ZnO, said main component consisting essentially of oxides of BaO, CaO, MgO, $TiO_2$, $ZrO_2$ and $Nb_2O_5$ and having a composition expressed by the general formula:

$$\{(Ba_{1-x-y}Ca_xMg_y)O\}_m(Ti_{1-o-p}Zr_oNb_p)O_{2+p/2}$$

wherein $0 < x \leq 0.20$, $0 < y \leq 0.05$, $0 < o \leq 0.25$, $0.0005 \leq p \leq 0.023$, and $1.000 \leq m \leq 1.03$, the content of said primary additive being 0.02 to 2.0 moles per 100 moles of said main component when calculated in terms of respective oxides, $MnO_2$, $Fe_2O_3$, $Cr_2O_3$, CoO and NiO, the content of said secondary additive being 0.1 to 2.0 moles per 100 moles of said main component.

* * * * *